US006147697A

United States Patent [19]

Deguchi et al.

[11] Patent Number: 6,147,697

[45] Date of Patent: Nov. 14, 2000

[54] IMAGE FORMING APPARATUS

[75] Inventors: Takashi Deguchi; Tuyosi Hattori; Manabu Nakahanada; Atsuro Yanata, all of Hino, Japan

[73] Assignee: Konica Corporation, Tokyo, Japan

[21] Appl. No.: 09/406,379

[22] Filed: Sep. 27, 1999

[30] Foreign Application Priority Data

Oct. 9, 1998 [JP] Japan .................................. 10-287534

[51] Int. Cl.[7] .............................. B41J 2/47; G03B 27/54

[52] U.S. Cl. .......................... 347/238; 347/241; 347/244; 355/67

[58] Field of Search .................................... 347/238, 122, 347/241, 243, 244; 313/496, 497; 355/67

[56] References Cited

U.S. PATENT DOCUMENTS

| | | | |
|---|---|---|---|
| 4,907,034 | 3/1990 | Doi et al. | 347/238 |
| 4,998,118 | 3/1991 | Ng | 347/238 |
| 5,032,911 | 7/1991 | Takimoto | 358/302 |
| 5,450,157 | 9/1995 | Rees | 355/67 |
| 5,543,830 | 8/1996 | Lea | 347/241 |
| 5,592,205 | 1/1997 | Shimizu et al. | 347/238 |
| 5,592,206 | 1/1997 | Watanabe et al. | 347/238 |
| 5,847,745 | 12/1998 | Schimizu et al. | 347/238 |
| 5,907,349 | 5/1999 | Shimizu et al. | 347/238 |
| 5,940,113 | 8/1999 | Wilson | 347/238 |
| 6,031,558 | 2/2000 | Hattori et al. | 347/238 |

FOREIGN PATENT DOCUMENTS 60-131738 7/1985 Japan .

*Primary Examiner*—Alan A. Mathews

*Attorney, Agent, or Firm*—Frishauf, Holtz, Goodman, Langer & Chick, P.C.

[57] ABSTRACT

An image recording apparatus having therein an image recording section includes: a light emitting dot row provided on a base plate and having thereon anodes arranged in a form of an array of a single row or a plurality of rows and having phosphors provided on the anodes; a cathode provided apart from the light emitting dot row, electrons emitted from the cathode colliding on the phosphors thereby the phosphors emit light; a grid which covers at least a part of the base plate in the vicinity of at least the light emitting dot row; an image focusing optical system having a focal depth of 350 $\mu$m for focusing light emitted from the light emitting dot row on an image recording position; a driving element for driving the light emitting dot row so that the light emitting dot row emits light; and a conveyance device which conveys the light emitting dot row or an image recording medium so that the image recording medium moves relatively to the light emitting dot row.

11 Claims, 13 Drawing Sheets

IMAGE FORMING APPARATUS

BACKGROUND OF THE INVENTION

The present invention relates to an image forming apparatus which employs recording sections arranged in an array form and conducts exposure on a photosensitive material moving relatively to the recording sections to form an image.

There has been a technology to record color images on a color silver halide photosensitive material by the use of light sources arranged in an array form (hereinafter referred to as "array light source"). With regard to the technology, there has been suggested an apparatus employing, for example, a print head having a vacuum fluorescent tube light source called VFPH (Vacuum Fluorescent Print Head). A vacuum fluorescent tube light source (VFPH) of this kind has special features that high luminance can easily be obtained, response is quick and a light source is of a thin type. As a phosphor used in this case, zinc oxide phosphor (ZnO:Zn) is selected mainly from the viewpoint of durability.

The vacuum fluorescent tube light source (VFPH) has therein a light emitting dot row wherein light emitting elements are arranged in an array of a row or plural rows on a base plate in a vacuum receptacle, the cathode stretched above the light emitting dot row, and a grid which covers at least a part of the base plate in the vicinity of the light emitting dot row, and it conducts exposure on a photosensitive material moving relatively to a recording section by using the recording section equipped with an image focusing optical system that forms an image outside the vacuum receptacle from light from a light emitting dot and is equipped with a driving element for a light emitting dot.

However, when conducting exposure on a photosensitive material by the use of an optical recording head equipped with light emitting dots arranged in an array form, it is necessary, for preventing dispersion of light sources of the optical recording head, to make corrections of an amount of emitted light in accordance with each phosphor.

Due to the short focal depth, it was impossible, in the conventional optical recording head, to correct a quantity of light sufficiently through photometry of a quantity of light alone. Therefore, a quantity of light has been corrected through densitometry of samples of exposed photosensitive materials. However, it has been necessary to repeat correction by densitometry, because of the short focal depth of an optical recording head and an influence of light emission of adjoining pixels in densitometry caused by blurring in photosensitive materials. Further, when correcting a quantity of emitted light through densitometry, density is changed also by shifted focus (image forming point), and when conducting exposure while moving an optical recording head and a photosensitive material, the quantity of light corrected once is changed by fluctuation of focus to cause dispersion, which has been a problem.

In the case of an optical recording head equipped with light emitting dots which are arranged in a form of an array, in particular, adjoining pixels are influenced by light emission to cause unstable quantity of light, thereby, density difference between adjoining pixels is caused, and a quantity of light is lowered when light emission is continued for a long time, which have been specific problems.

SUMMARY OF THE INVENTION

The invention has been achieved in view of the problems stated above, and its object is to solve the problems specific to an optical recording head equipped with light emitting dots which are arranged in a form of an array, and thereby to provide an image forming apparatus capable of forming excellent images.

The invention is structured as follows to solve the problems mentioned above and to attain the aforesaid object.

(1) An image recording apparatus having therein an image recording section comprising:

- a light emitting dot row which is provided on a base plate, has thereon anodes arranged in a form of an array of a single row or plural rows and has phosphors provided on the anodes;
- a cathode provided apart from the light emitting dot row, electrons emitted from the cathode colliding on the phosphors thereby the phosphors emit light;
- a grid which covers at least a part of the base plate in the vicinity of the light emitting dot row;
- an image focusing optical system which has the focal depth of at least 350 μm and forms an image on an image recording position from light emitted from the light emitting dot row;
- a driving element which drives the light emitting dot row so that it may emit light; and
- a conveyance device which conveys the light emitting dot row or an image recording medium so that the image recording medium may move relatively to the light emitting dot row.

(2) The image recording apparatus according to Structure (1), wherein the focal depth of the image focusing optical system is not more than 1000 μm.

(3) The image recording apparatus according to Structure (1), wherein the focal depth of the image focusing optical system is not more than 800 μm.

(4) The image recording apparatus according to Structure (1), wherein the focal depth of the image focusing optical system is in a range of 400 μm–600 μm.

(5) The image recording apparatus according to Structure (1), wherein the image focusing optical system is arranged to be shifted from the image recording position where light emitted from the light emitting dot row is focused in the optical axis direction by the distance which is greater than 0% and is not more than 60% of the focal depth.

(6) An image recording method having the step to drive the light emitting dot row in accordance with image data so that light may be emitted from the light emitting dot row of an image recording head having a light emitting dot row which is provided on a base plate, has thereon anodes arranged in a form of an array of a single row or plural rows, and has phosphors provided on the anodes, a cathode provided apart from the light emitting dot row, and a grid which covers at least a part of the base plate in the vicinity of the light emitting dot row, electrons emitted from the cathode colliding on the phosphors thereby the phosphors emit light, then, to make the light emitted from the light emitting dot row to pass through an image focusing optical system having the focal depth of 350 μm or more, and to make the light emitted from the light emitting dot row to form an image on an image recording medium which moves relatively to the light emitting dot row.

(7) The image recording method according to Structure (6), wherein the focal depth of the image focusing optical system is not more than 1000 μm.

(8) The image recording method according to Structure (6), wherein the focal depth of the image focusing optical system is not more than 800 μm.

(9) The image recording method according to Structure (6), wherein the focal depth of the image focusing optical system is within a range of 400 μm–600 μm.

(10) The image recording method according to Structure (6), wherein the image focusing optical system is arranged to be shifted from the image recording position where light emitted from the light emitting dot row is focused in the optical axis direction by the distance which is greater than 0% and is not more than 60% of the focal depth.

(11) The image recording method according to Structure (6), wherein the image recording medium is a silver halide photosensitive material.

In addition, the preferable structures are as follows.

(12) An image forming apparatus which has therein a row of light emitting dots in which phosphors are arranged in a form of an array of a row or plural rows on a base plate, a cathode stretched "above" the light emitting dot row, and a grid which covers at least a part of the base plate in the vicinity of the light emitting dot row, and uses a recording section equipped with an image focusing optical system that forms an image with light from the light emitting dot and is equipped with a driving element for the light emitting dot to conduct exposure on a photosensitive material which moves relatively to the recording section, wherein the focal depth of the image focusing optical system is 350 $\mu$m or more.

The above-mentioned term "above" is not limited to the literal sense of the word. The cathode may be stretched "below" the light emitting dot row. In any case, the cathode may be provided apart from the light emitting dot row. Thus, it should be understood that the term "above" representing the positional relationship between the cathode and the light emitting dot row which will be used in the specification hereinafter, has the same meaning as that explained.

In the Structure (12), the focal depth of the image focusing optical system is long to be 350 $\mu$m or more. Therefore, it is possible to correct a quantity of light by photometry of a quantity of light alone and thereby to control dispersion of a quantity of light.

(13) An image forming apparatus which has therein a row of light emitting dots in which phosphors are arranged in a form of an array of a row or plural rows on a base plate, a cathode stretched above the light emitting dot row, and a grid which covers at least a part of the base plate in the vicinity of the light emitting dot row, and uses a recording section equipped with an image focusing optical system that forms an image with light from the light emitting dot and is equipped with a driving element for the light emitting dot to conduct exposure on a photosensitive material which moves relatively to the recording section, wherein the distance between each phosphor and the cathode is mostly the same for all phosphors.

In the Structure (13), the distance between each phosphor and the cathode is mostly the same for all phosphors, and therefore, it is hardly influenced by light emission of adjoining pixels, and a quantity of light is stabilized.

(14) The image forming apparatus according to Structure (13), wherein the distance between the phosphor and the cathode is shorter than that between the grid and the cathode.

In the Structure (14), the distance between the phosphor and the cathode is shorter than that between the grid and the cathode, and thereby, it is more hardly influenced by light emission of adjoining pixels, and a quantity of light is stabilized.

(15) An image forming apparatus which has therein a row of light emitting dots in which phosphors are arranged in a form of an array of a row or plural rows on a base plate, a cathode stretched above the light emitting dot row, and a grid which covers at least a part of the base plate in the vicinity of the light emitting dot row, and uses a recording section lequipped with an image focusing optical system that forms an image with light from the light emitting dot and is equipped with a driving element for the light emitting dot to conduct exposure on a photosensitive material which moves relatively to the recording section, wherein the area on the base plate which is not covered by the grid or an anode is mostly the same.

In the Structure (15), occurrence of fluctuation of a quantity of light which is considered to be caused by accumulation of electrons on the grid portion can be reduced, because the space which is not covered by the grid or an anode is mostly the same.

(16) An image forming apparatus which has therein a row of light emitting dots in which phosphors are arranged in a form of an array of a row or plural rows on a base plate, a cathode stretched above the light emitting dot row, and a grid which covers at least a part of the base plate in the vicinity of the light emitting dot row, and uses a recording section equipped with an image focusing optical system that forms an image with light from the light emitting dot and is equipped with a driving element for the light emitting dot to conduct exposure on a photosensitive material which moves relatively to the recording section, wherein voltage of the grid is higher than that of the phosphor.

In the Structure (16), it is possible to reduce density difference caused between adjoining pixels, because voltage of the grid is higher than that of the phosphor.

(17) An image forming apparatus which has therein a row of light emitting dots in which phosphors are arranged in a form of an array of a row or plural rows on a base plate, a cathode stretched above the light emitting dot row, and a grid which covers at least a part of the base plate in the vicinity of the light emitting dot row, and uses a recording section equipped with an image focusing optical system that forms an image with light from the light emitting dot and is equipped with a driving element for the light emitting dot to conduct exposure on a photosensitive material which moves relatively to the recording section, wherein the cathode, the phosphor and the grid are not energized except when the phosphor is emitting light.

In the Structure (17), it is possible to prevent that a quantity of light is lowered by light emission of the phosphor, because the cathode, the phosphor and the grid are not energized except when the phosphor is emitting light.

(18) The image forming apparatus according to either one of Structures (12)–(17), wherein the image focusing optical system is a SELFOC lens array.

In the Structure (18), it is possible to make the total apparatus to be small in size and to be low in cost, because the image focusing optical system is a SELFOC lens array.

(19) An image forming apparatus which has therein a row of light emitting dots in which phosphors are arranged in a form of an array of a row or plural rows on a base plate, a cathode stretched above the light emitting dot row, and a grid which covers at least a part of the base plate in the vicinity of the light emitting dot row, and uses a recording section equipped with an image focusing optical system that forms an image with light from the light emitting dot and is equipped with a driving element for the light emitting dot to conduct exposure on a photosensitive material which moves relatively to the recording section, wherein the image focusing optical system is a SELFOC lens array, and arrangement of the SELFOC lens is greater in terms of number than light emitting dot rows.

In the Structure (19), arrangement of the SELFOC lens is greater in terms of number than light emitting dot rows, and therefore, the focal depth is long, and it is possible to correct a quantity of light through photometry of a quantity of light alone, dispersion of a quantity of light can be controlled, focus fluctuation hardly influences, and no problem is caused with broader tolerance even when light emitting dots and SELFOC lenses are attached inaccurately.

(20) The image forming apparatus according to either one of Structures (12)–(19), wherein the cathode is in a form of a wire.

In the Structure (20), the cathode is in a form of a wire, and it is therefore possible to install easily, and even plural cathodes can easily be installed.

Figure 6:
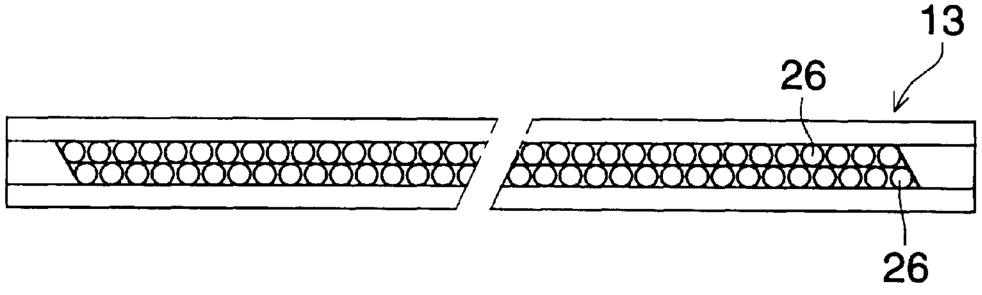
Figure 6:
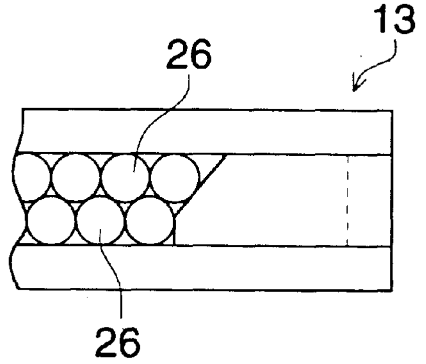
Figure 6:
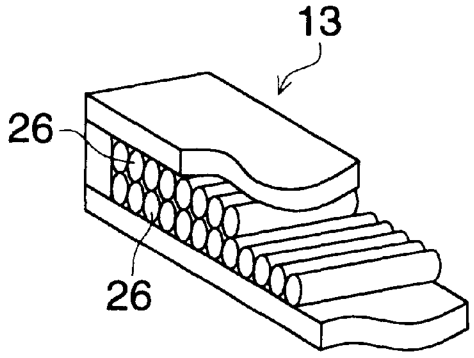

Each of FIGS. 6(*a*), 6(*b*) and 6(*c*) is a diagram showing a SELFOC lens array constituting an image focusing optical system used in VFPH.

Figure 7:
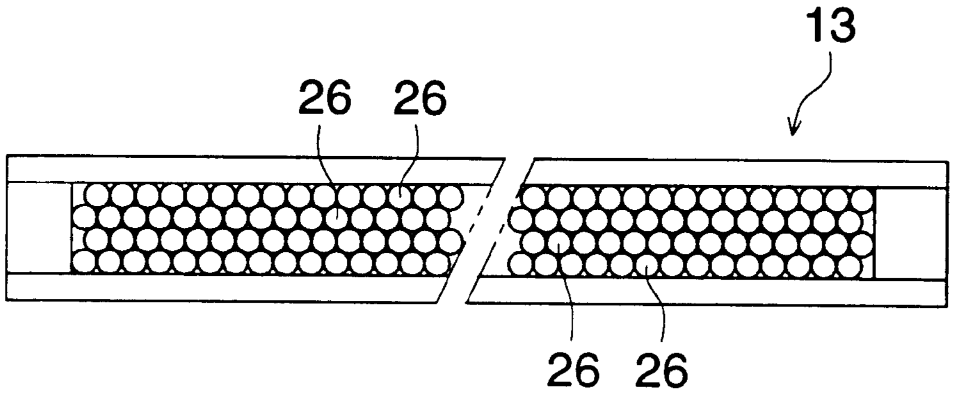
Figure 7:
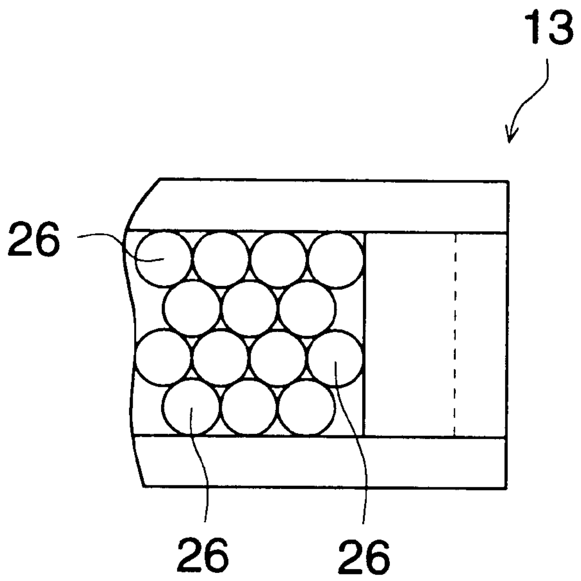

Each of FIGS. 7(*a*) and 7(*b*) is a diagram showing a SELFOC lens array constituting an image focusing optical system used in VFPH.

Figure 8:
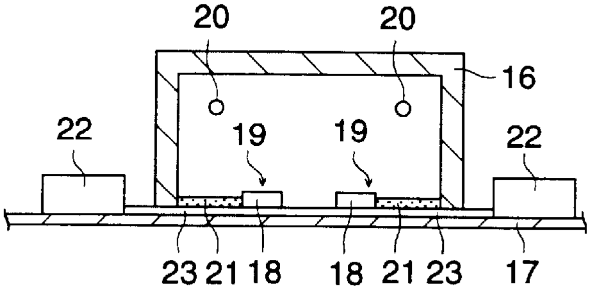
Figure 8:
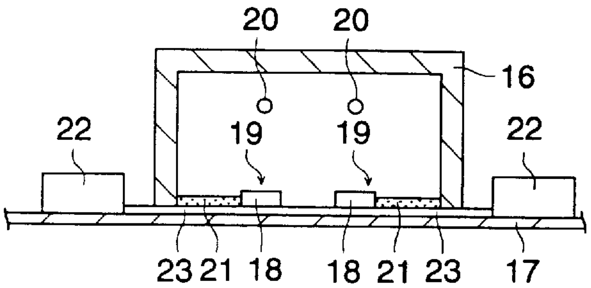
Figure 8:
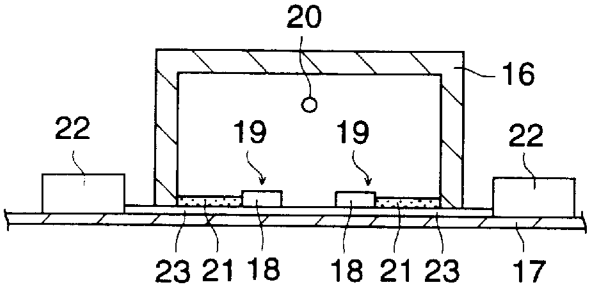
Figure 8:
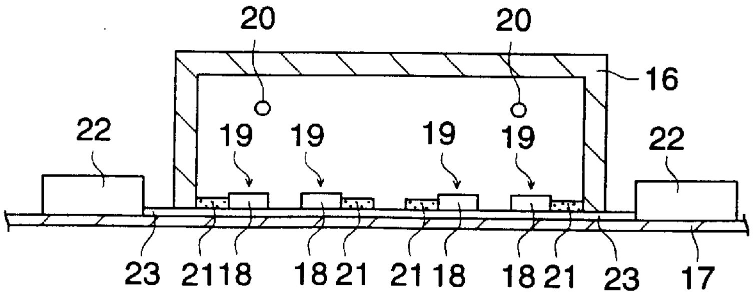

Each of FIGS. 8(*a*), 8(*b*), 8(*c*) and 8(*d*) is a diagram showing the distance between a phosphor of a light emitting dot row and a cathode.

Figure 9:
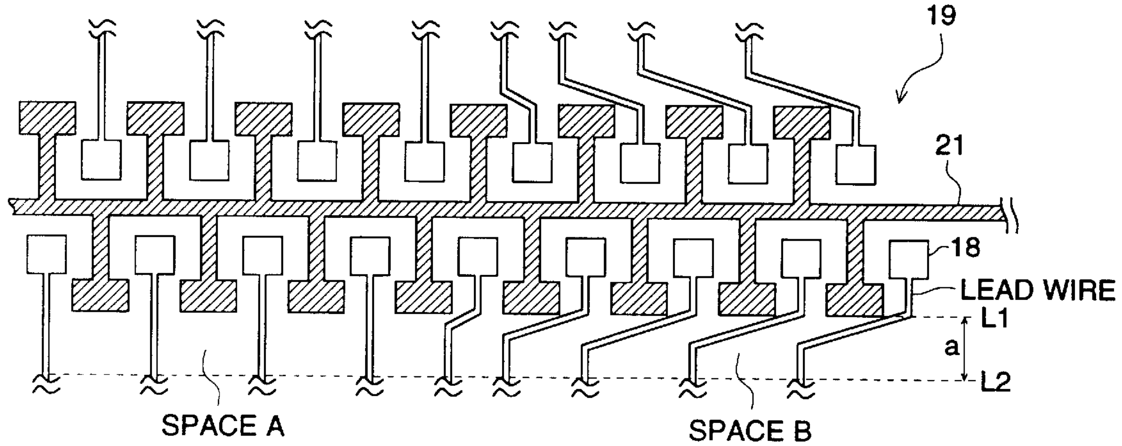
Figure 9:
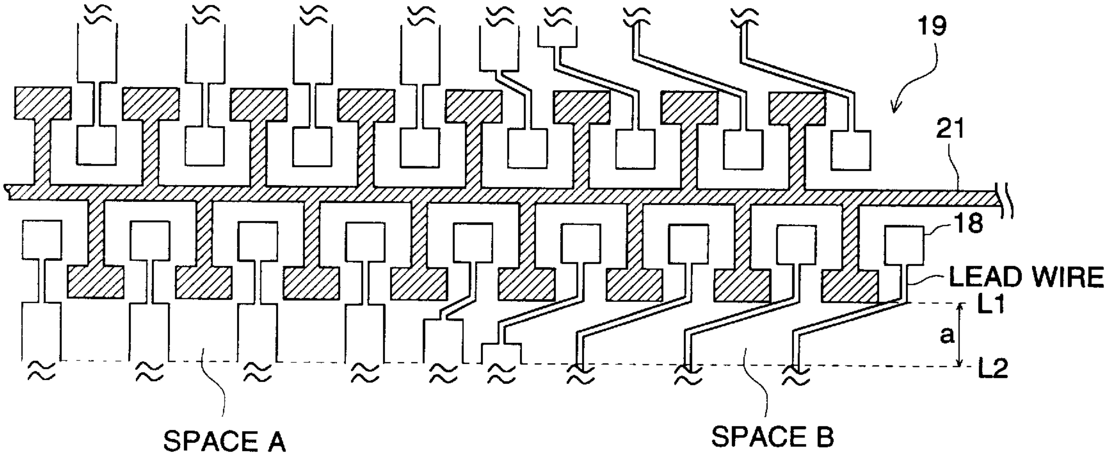
Figure 9:
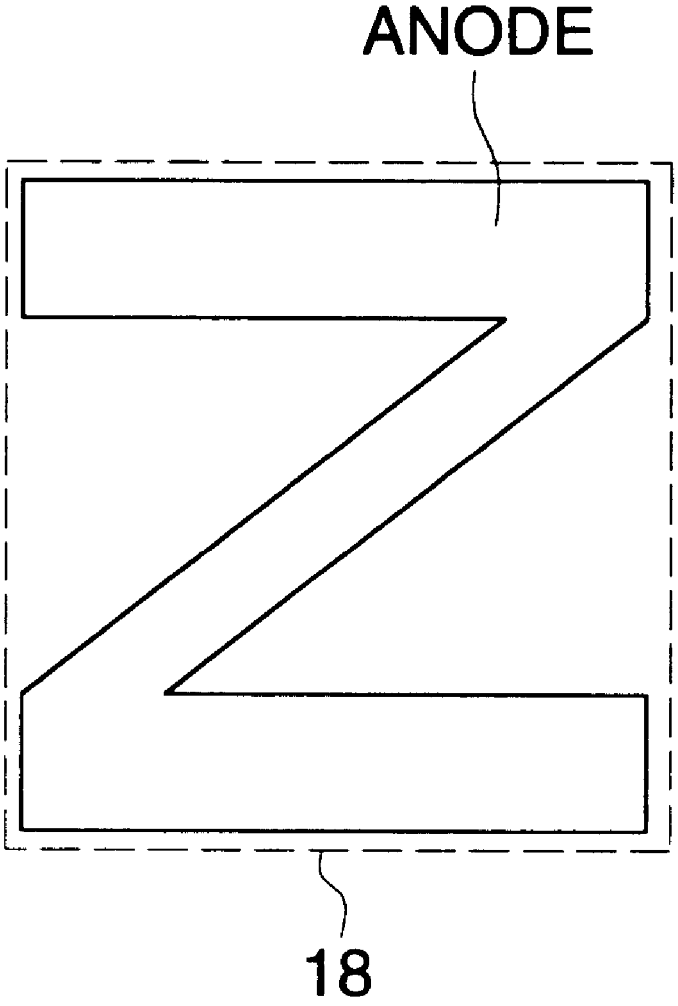

FIGS. 9(*a*) and 9(*b*) are diagrams showing arrangement of spaces for grids in a light emitting dot row for a comparative example and an embodiment of the present invention, respectively. FIG. 9(*c*) is a diagram showing an enlarged view of phosphor 18 in FIG. 9(*b*) of the embodiment.

Figure 10:
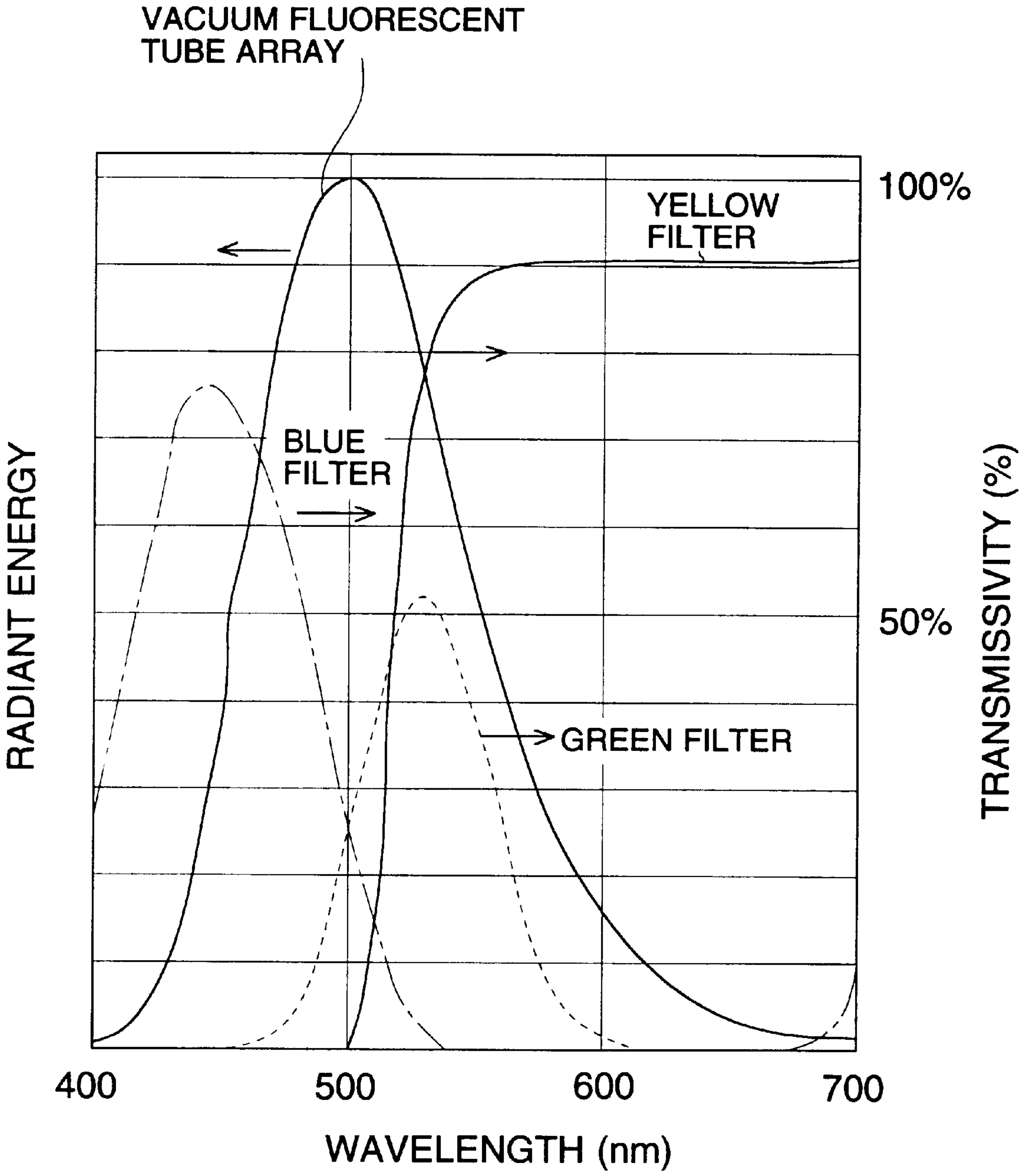

FIG. 10 is a diagram showing relationship between spectral transmissivity of a red filter, a blue filter and a green filter and a vacuum fluorescent tube array wherein zinc oxide phosphor (ZnO:Zn) is used.

Figure 11:
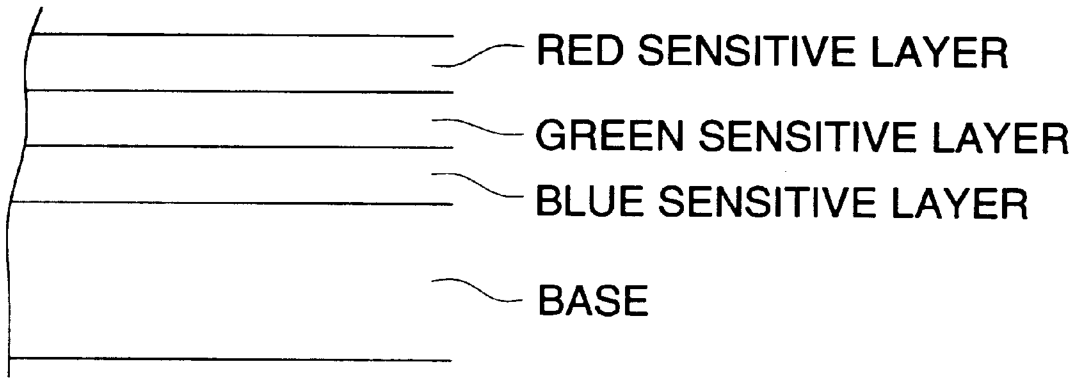

FIG. 11 is a diagram showing the layer structure for each color forming on a photographic paper representing a silver halide color photosensitive material.

Figure 12:
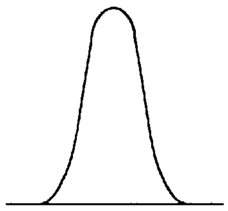
Figure 12:
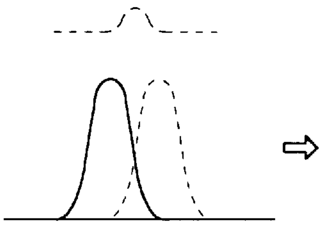
Figure 12:
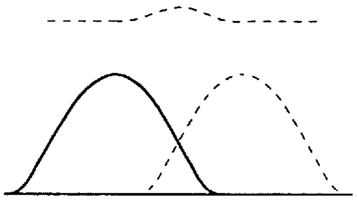

Each of FIGS. 12(*a*), 12(*b*) and 12(*c*) is a diagram showing relationship between a quantity of light and density representing characteristics of a photosensitive material.

Figure 13:
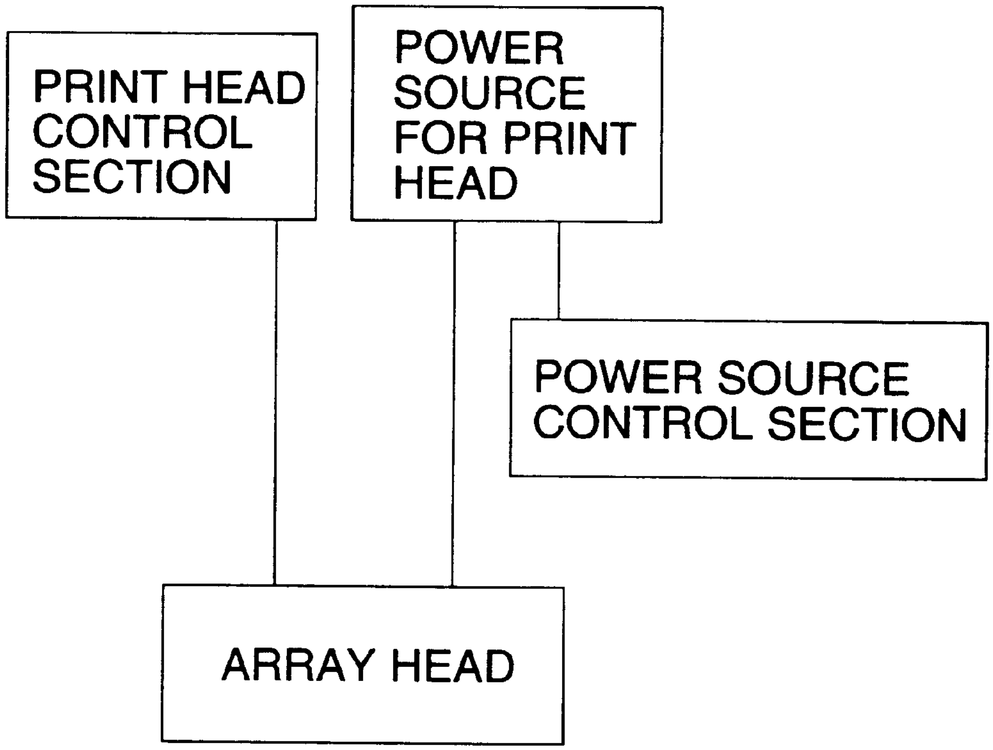

FIG. 13 is a block diagram showing how voltage supply to an array head is controlled by signals from a voltage control section.

DETAILED DESCRIPTION OF THE PREFERRED EMBODIMENT

An embodiment of the image forming apparatus of the invention will be explained in detail as follows, referring to the drawings. The invention is not limited to the embodiment explained below.

Figure 1:
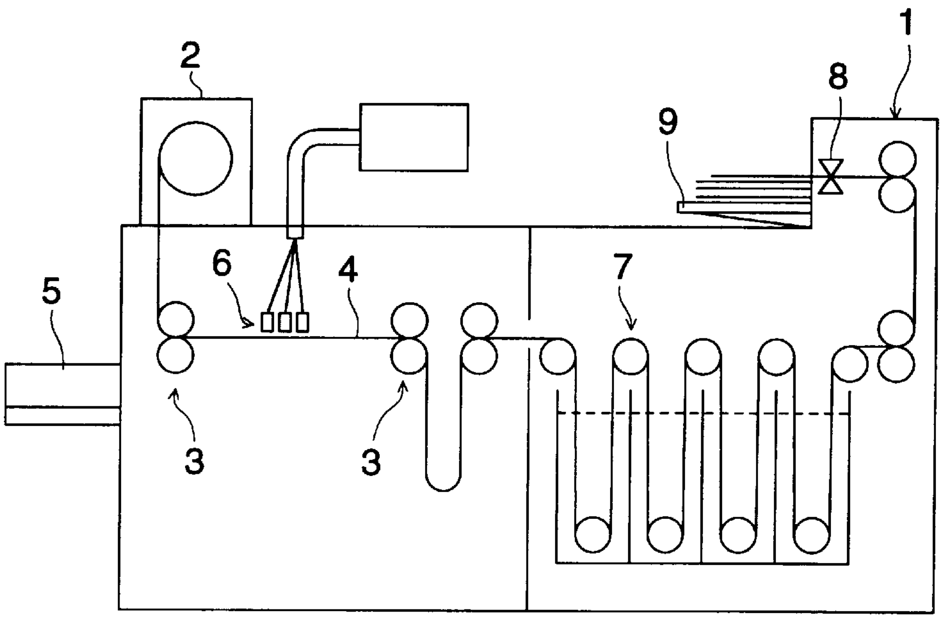
FIG. 1 is a schematic structure diagram of an image printer to which the invention is applied.
Figure 2:
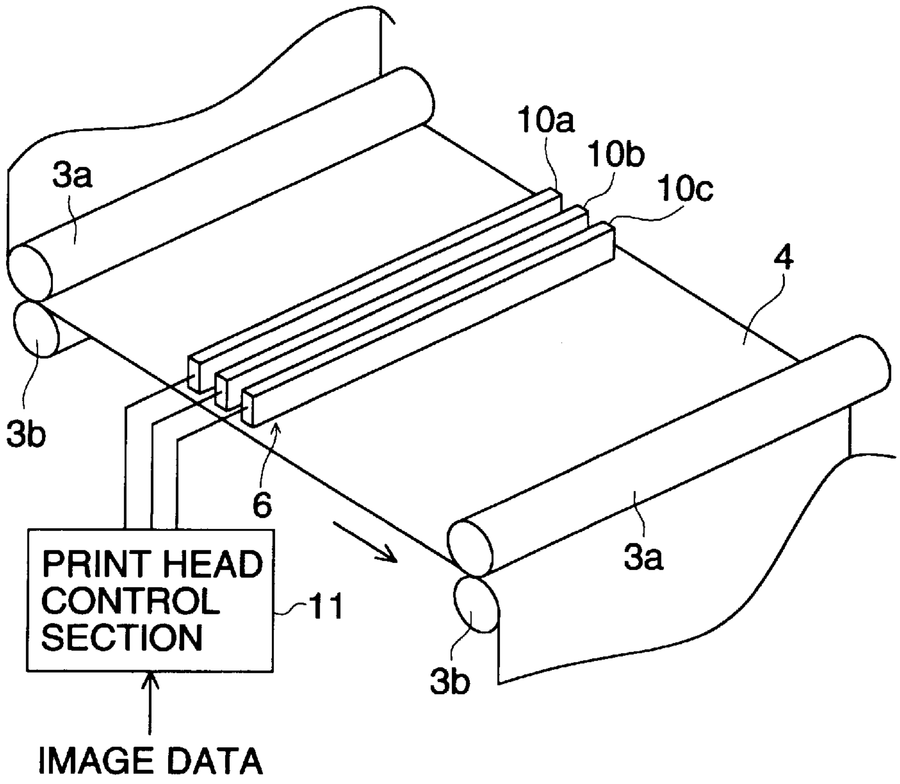
FIG. 2 is a perspective view of the enlarged recording section.
Figure 3:
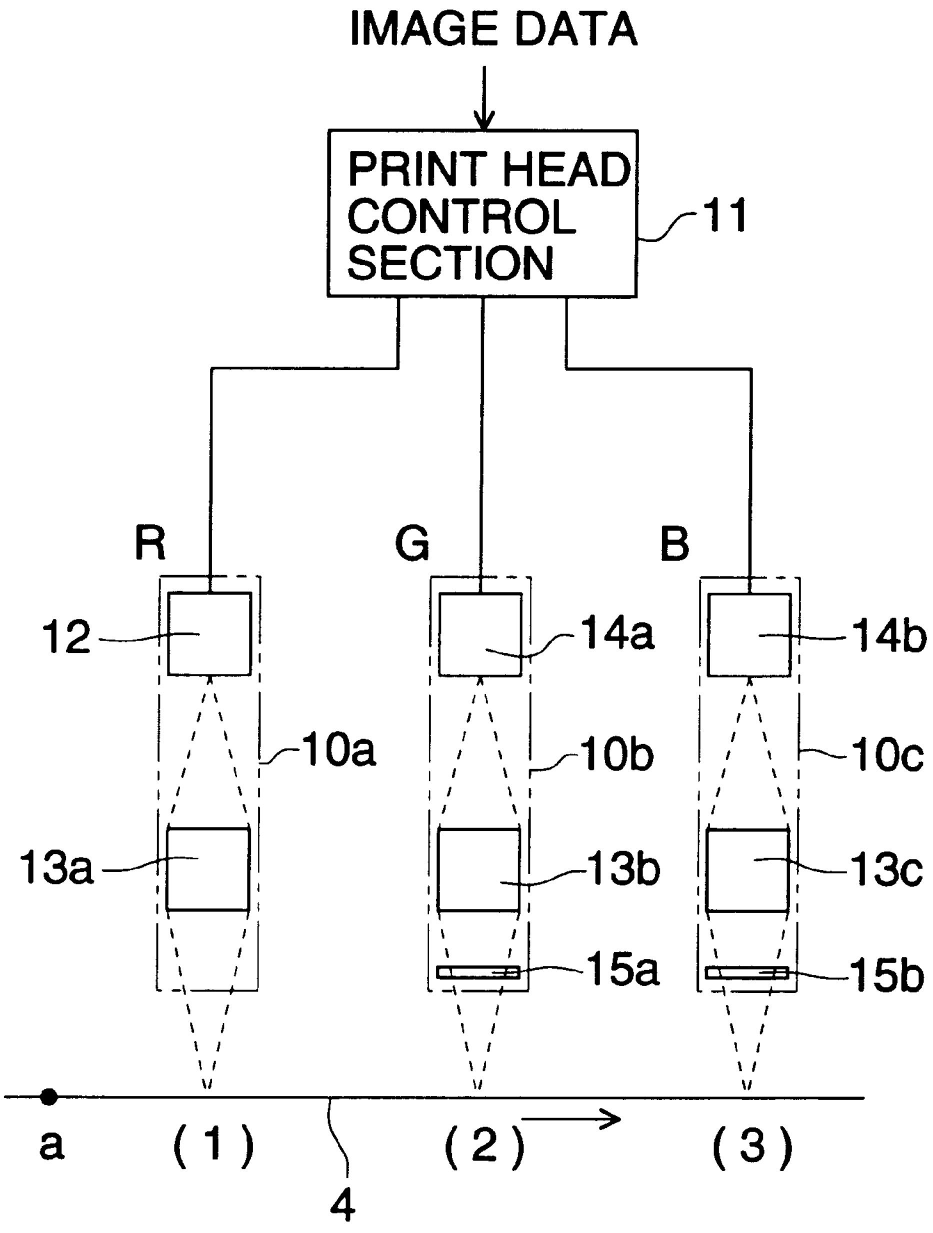
FIG. 3 is an enlarged illustration showing the relationship between a silver halide color photosensitive material (photographic paper) and a recording section.
Figure 4:
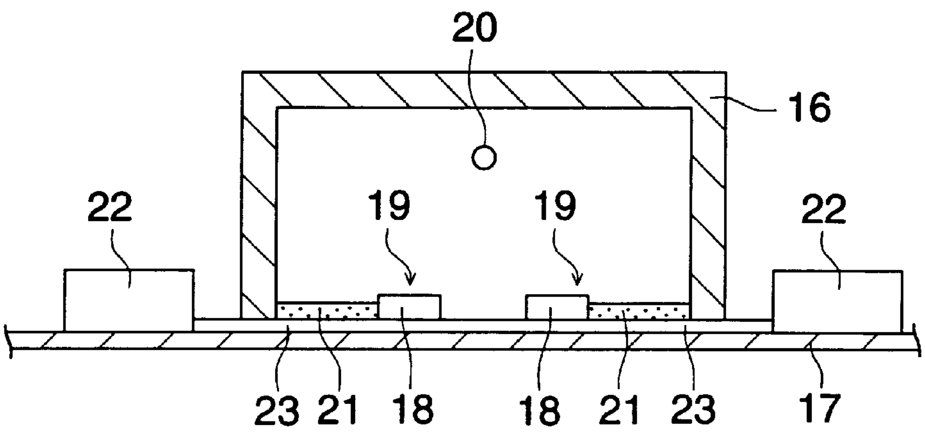
FIGS. 4(*a*) and 4(*b*) show a part of the structure of VFPH, and FIG. 4(*a*) is a sectional view of a vacuum receptacle and FIG. 4(*b*) is a diagram of relationship between a light emitting dot row and a cathode.
Figure 4:
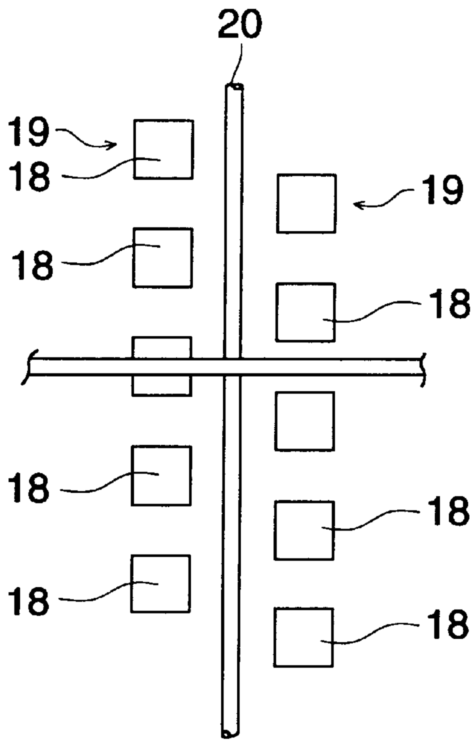
Figure 5:
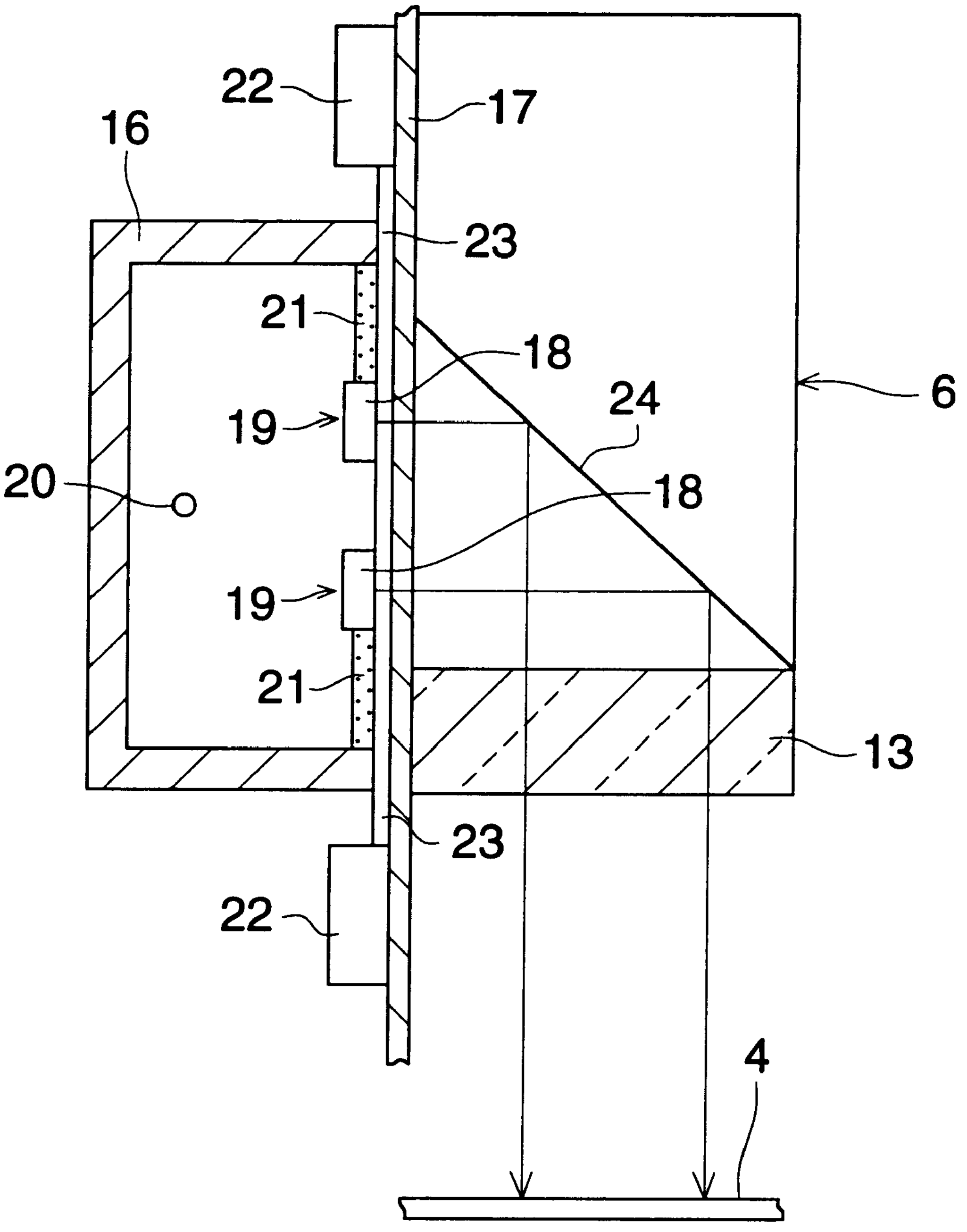
FIG. 5 is a sectional view showing the structure of VFPH.

FIG. 1 is a schematic structure diagram of an image printer to which the invention is applied, FIG. 2 is a perspective view of the enlarged recording section, FIG. 3 is an enlarged illustration showing the relationship between a silver halide color photosensitive material (photographic paper) and a recording section, FIGS. 4(*a*) and 4(*b*) show a part of the structure of VFPH (vacuum fluorescent tube print head), and FIG. 4(*a*) is a sectional view of a vacuum receptacle and FIG. 4(*b*) is a diagram of relationship between a light emitting dot row and a cathode, FIG. 5 is a sectional view showing the structure of VFPH, and each of FIGS. 6 and 7 is a diagram showing a SELFOC lens array constituting an image focusing optical system used in VFPH.

Main body 1 of an image printer constituting an image forming apparatus is structured so that image information taken in by scanner 5 is recorded by recording section 6 on photographic paper 4 drawn out of photographic paper magazine 2 by conveyance means 3, then the photographic paper is conveyed to developing section 7 to be developed, then is cut in the prescribed size by cutter 8 to be ejected onto sheet ejection tray 9, as shown in FIG. 1. Incidentally, cutting can also be conducted naturally at the position right before conveying to the developing section 7.

With regard to the recording section 6 stated above, when photographic paper 4 representing a color silver halide photosensitive material stretched and held by driving rollers 3*a* and 3*b* which are connected to the driving source (not shown) to rotate is conveyed in the arrowed direction, red light source print head 10*a* having an LED array, green light source print head 10*b* and blue light source print head 10*c* both having a vacuum fluorescent tube array all used as an optical recording head are controlled in terms of exposure by print head controlling section 11 in accordance with image data, and exposure is conducted at the prescribed position on photographic paper 4 for each color, as shown in FIG. 2. After completion of this exposure process, photographic paper 4 is conveyed to developing section 7 as stated above to be subjected to prescribed development processing, thus, outputted images are obtained.

On each print head, there are used plural recording elements (light emitting dots) which are arranged in a form of an array in a single row or plural rows, as shown in FIG. 3. On red light source print head 10*a*, there is used LED array 12 having recording element (light emitting dot) density of 300 dpi, as a light emitting dot row. The one wherein an SELFOC lens array is combined with LED array 12 as image focusing optical system 13*a* is employed as red light source print head 10*a*.

In blue light source print head 10*c*, there are used vacuum fluorescent tube arrays 14*a* and 14*b* having recording element (light emitting dot) density of 300 dpi, as a light emitting dot row. The one wherein an SELFOC lens array is combined with vacuum fluorescent tube arrays 14*a* and 14*b* as image focusing optical systems 13*b* and 13*c* is employed as a vacuum fluorescent tube print head. In a vacuum fluorescent tube print head, there is employed one wherein filters 15*a* and 15*b* for color separation are combined.

The one wherein SELFOC lens array (image focusing optical system) is combined with each of vacuum fluorescent tube arrays 14*a* and 14*b* in this case is what is called "VFPH". In case of VFPH in the present embodiment, driver IC 22 for driving light emitting dots is provided outside vacuum receptacle 16.

Details of VFPH in the present embodiment will be shown in FIGS. 4(*a*) and 4(*b*) and in FIG. 5. Namely, it is provided with light emitting dot row 19 wherein phosphors 18 are arranged in a form of an array in one row or plural rows on base plate (constituting a part of receptacle 16) 17 inside vacuum receptacle 16, wire-shaped cathode 20 stretched above the space between light emitting dot rows 19, and with grid 21 covering at least of a part of a base plate in the vicinity of the light emitting dot row 19. This grid 21 mainly covers wiring 23 which connects phosphor 18 to driver IC 22 so that no influence caused by an amount of electrons emitted from cathode 20 may be given. Cathode 20 is in a form of a wire, and it is therefore easy to install, and even plural cathodes can easily be installed.

When electrons emitted from cathode 20 hit phosphor 18 constituting light emitting dot row 19, the phosphor emits light which is reflected on reflection plate 24 and passes through image focusing optical system 13 composed of SELFOC lens array to form images on photographic paper (silver halide color photosensitive material) 4. This image focusing optical system 13 is provided outside receptacle 16 and driver IC 22 representing a driving element of light emitting dot row 19 is also provided outside receptacle 16 to constitute recording section 6.

By providing driver IC 22 representing a driving element for light emitting dots outside receptacle 16, it is possible to prevent gas components sticking to the surface of the driver IC 22 from being carried in vacuum receptacle 16, and thereby to remove the cause for luminescence drop of the phosphor caused by presence of gas components in the receptacle.

As the image focusing optical system 13, a SELFOC lens array is used, and the SELFOC lens array has an advantage to contribute to realization of an apparatus which is small in total size and is low in cost. The SELFOC lens array may either be structured with double-layered and staggered rod lenses 26 as shown in FIGS. 6(*a*)–6(*c*), or be structured with four-layered and staggered rod lenses 26 as shown in FIGS. 7(*a*) and 7(*b*). By using multi-layered and staggered rod lenses 26 as stated above, it is possible to converge even the light which is out of an angular aperture of rod lens 26, whereby, a loss of a quantity of light can be reduced, and brightness and high resolution can be obtained. In particular, it is preferable to provide multi-layered and staggered rod lenses 26 for each light emitting dot row. When further quantity of light is required, voltage of a light emitting dot electrode (anode) can be increased.

Photographic paper 4 representing a silver halide color photosensitive material moves relatively to recording section 6 so that exposure may be carried out. Incidentally, though photographic paper 2 is explained to be in a roll type, it may also be of a cut sheet type. Conveyance means 3 for photographic paper 2 does not need to be limited to driving rollers 3*a* and 3*b* shown in FIG. 1. Further, either of a type wherein photographic paper 2 is fixed and a print head is moved and a type wherein a photographic paper and a print head are moved is acceptable.

Next, recording operations of VFPH will be explained as follows, referring to FIG. 3. Red light source print head 10*a* having LED array 12, green light source print head 10*b* having vacuum fluorescent tube array 14*a* and blue light source print head 10*c* having vacuum fluorescent tube array 14*b* are arranged in succession in the direction of conveyance for photographic paper 4, and when these print heads are subjected to exposure control in accordance with image data by print head control section 11, irradiation light forms an image on photographic paper 4 through each of SELFOC lens arrays 13*a*, 13*b* and 13*c*. Yellow filter 15*a* and blue filter 15*b* are inserted respectively in green light source print head lOb and blue light source print head 10*c*. An ND filter may be added to each print head for adjustment of a quantity of light, if necessary.

The reason for using yellow filter 15*a* for green color separation is that the yellow filter is higher than the green filter in terms of transmittance for green light, as is understood from FIG. 10. In general, for filters for color separation of blue color, green color and red color, there are used a blue filter mainly transmits light on a zone of wavelength shorter than about 500 nm, a green filter mainly transmits light on a zone between about 500 nm to 600 nm and a red filter mainly transmits light on a zone of wavelength longer than about 600 nm.

Incidentally, the yellow filter mentioned above is generally called a yellow filter or a Y filter and is available on the market. For example, LEE filter HT015 (Y filter) made by Konica Color Photo Equipments Co., Ltd. has transmissivity of 50% or more for the wavelength of 550 nm, and it can be used desirably. Namely, the filter having transmissivity of 50% or more for 550–700 nm and of 5% or less for 400–480 nm is preferable. For the blue filter, LEE filter 181 (B filter) made by LEE Filters Co. in England has transmissivity of 30% or more for the wavelength of 430 nm and it can be used desirably in the same way as in the foregoing. Since filters on the market can be used, it is possible to make an apparatus to be inexpensive.

As shown in FIG. 10, the green filter which is interposed between the blue wavelength area and the red wavelength area inevitably takes a type of the band pass in filter, and peak transmissivity becomes small because light leakage for blue and red is deterred, thus, green light of vacuum fluorescent tube array 14*a* can not be taken out efficiently. The yellow filter, on the other hand, transmits the wavelength area longer than about 500 nm, thereby, green light of vacuum fluorescent tube array 14*a* can be taken out efficiently.

However, the yellow filter transmits also red light simultaneously, but sensitivity of photographic paper 4 for red is extremely low, which causes no color forming for red. Therefore, employment of vacuum fluorescent tube array 14*a* for recording on photographic paper 4 makes it possible to use yellow filter 15*a*, which makes it possible to raise exposure efficiency for green and makes the high speed exposure for high image quality to be possible.

An occasion of color recording equivalent to one line at point "a" on photographic paper 4 will be explained by the use of FIG. 3. First, print head control section 11 transmits to each print head red image data, green image data and blue image data each being equivalent to one line. Conveyance means 3 is conveying photographic paper 4 at constant speed in the arrowed direction, and when the point "a" arrives at image forming point (1) for the red light source print head 10*a*, the red light source print head 10*a* conducts exposure in accordance with image data and records on photographic paper 4 concerning red image data.

Then, as photographic paper 4 is conveyed in succession, the exposure control identical to the foregoing is conducted in synchronization with arrival of the point "a" at image forming point (2) for the green light source print head 10*b* and at image forming point (3) for the blue light source print head 10*c*, and color recording is conducted on the point "a". By repeating these operations for all lines, it is possible to record color images on the prescribed area on the photographic paper 4.

Though the recording operations have been explained as an example of an array wherein recording elements equivalent to one line of image data are arranged in FIG. 3, it is also possible to record color images by taking the timing properly between the image forming position of each print head and the recording position on the photographic paper, and by conducting exposure control, even for the array with plural lines of recording elements, or for the array wherein recording elements are arranged in a form of a two-dimensional panel. Further, even when conducting image recording by combining a back light, a filter and a shutter array such as a liquid crystal shutter array, PLZT (lead, lanthanum, zirconium, titanium and a compound oxide) and an optical shutter array, as another embodiment of the invention, the same effect can be obtained.

In the Structure (12) mentioned earlier, the focal depth of image focusing optical system 13 is 350 μm or more. When conducting exposure on a photosensitive material by using a print head having light emitting dot row 19 arranged in a form of an array, it is necessary to correct a quantity of emitted light corresponding to each phosphor 18, for the purpose of preventing light source unevenness of the print head. The focal depth in this case means an amount of deviation of an image plane wherein 10% or more thereof can secure 6 lp/mm. In the case of a conventional print head, it was impossible to correct a quantity of light sufficiently through photometry of a quantity of light alone, because the focal depth was short. Therefore, a quantity of light has been corrected through densitometry of samples of exposed photosensitive materials. However, it has been necessary to repeat correction by densitometry, because of the short focal depth of a print head and an influence of light emission of adjoining pixels in densitometry caused by blurring of photosensitive materials. Further, when correcting a quantity of emitted light through densitometry, density is changed also by shifted focus (image forming point), and when conducting exposure while moving a print head and a photosensitive material, the quantity of light corrected once is changed by fluctuation of focus to cause dispersion, which has been a problem. However, by making the focal depth to be 350 μm or more, it is possible to correct a quantity of light through photometry of a quantity of light only and thereby to control dispersion of a quantity of light, because the focal depth is long. When recording images on a silver photosensitive material by the use of a light emitting dot row, in particular, it is preferable to make the focal depth of image focusing optical system 13 to be 350 μm or more.

With regard to layer structure of a photosensitive material, it is general that each color forming has its own layer. For example, in the case of a photographic paper which is a silver halide color photosensitive material, it is generally structured as shown in FIG. 11. In this case, the lower the layer is, the more the image tends to be blurred by reflection and bleeding in the inner part of the photosensitive material. Therefore, there is a focal depth corresponding to the position of each photosensitive layer, and in the case of the example mentioned above, it is preferable that the focal depth is within a range of 350 μm–1000 μm for the green light source to expose a green-sensitive layer and the blue light source to expose a blue-sensitive layer.

The range of 350 μm–800 μm is more preferable and the range of 400 μm–600 μm is most preferable. When the focal depth is 350 μm or more, an effect of the invention can be exhibited, but a lens having greater focal depth generally causes more loss of light, compared with a lens having the same f-number. In the case of scanning exposure, therefore, the conveyance speed needs to be lowered and a quantity of light of the light source needs to be increased. Therefore, the ranges stated above are preferably used, especially in the case of a silver halide photographic photosensitive material.

Though an example in FIG. 11 has been used for explanation, when the photosensitive layer structure is different, it is naturally preferable to use within a range corresponding to the different structure.

Further, when conducting exposure on a photosensitive material by the use of a head of an array type, if the best focus is used for the exposure, image forming by each light emitting element is too sharp, and a difference of a quantity of light between light emitting elements sometimes tends to be conspicuous.

This is considered to be influenced by the relationship between a quantity of light and density which is a characteristic of a photosensitive material. Namely, distribution of a quantity of light for light emitting elements is considered to be the distribution having its peak on the central portion thereof as shown in FIG. 12(*a*), and density on the central portion is high because of a great deal of light, although no density appears on both ends because of a small amount of light which does not reach the sensitivity point of a photosensitive material.

In this case, even when light energy of each light emitting element is made uniform by the correction, uneven density is observed on the photosensitive material if an optical system with high magnification such as a magnifier is used for observation. It is therefore possible to lower the uneven density by shifting the focal distance like shifting the focus point from the best focus point within a range where resolution of characters is not influenced, which is preferable.

When adjoining light emitting elements overlap (FIG. 12(*b*)), this overlapped portion sometimes causes blotches. Even in this case, the effect is exhibited (FIG. 12(*c*)).

BFP mentioned in the invention represents a point where MTF is greatest and the focal depth in the positive direction is mostly the same as that in the negative direction. By shifting the image forming distance from BFP within a range of 60% of the focal depth, it is possible to lower sharp unevenness of a quantity of light without deteriorating resolution and photographic characteristics, which is preferable.

When controlling within a range of 40–60%, more effect of the invention can be exhibited.

ex.) focal depth of 400 μm . . . 160–240 μm from BFP
focal depth of 450 μm . . . 180–270 μm from BFP In the Structure (13), the distance between phosphor 18 of light emitting dot row 19 and cathode 20 is mostly the same in each phosphor 18 as shown in FIGS. 8(*a*)–8(*d*). Mostly the same distance in this case means that each distance between each phosphor 18 of light emitting dot row 19 and cathode 20 obtained through measurement is within ±15% from the mean value of the maximum value and the minimum value. In FIG. 8(*a*), paired grids 21 and paired phosphors 18 are arranged in vacuum receptacle 16, and cathode 20 is arranged to be stretched above each grid 21, while in FIG. 8(*b*), cathode 20 is arranged to be stretched above each phosphor 18, and in FIG. 8(*c*), cathode 20 is arranged to be stretched above the space between the paired phosphors 18. In FIG. 8(*d*), two groups each being composed of paired grids 21 and paired phosphors 18 are arranged independently at two locations in vacuum receptacle 16, and cathode 20 is arranged to be stretched above the space between the paired phosphors 18 in one group mentioned above and cathode 20 is arranged to be stretched above the space between the paired phosphors 18 in the other group both arranged independently.

As stated above, the distance between each phosphor 18 of light emitting dot row 19 and cathode 20 is mostly the same for all phosphors 18, and thereby, there is less influence of light emission of adjoining pixels, and a quantity of light is stabilized. The cause of the influence of light emission of adjoining pixels is considered to be distribution of an electric field which is changed in accordance with light emission of adjoining pixels. Therefore, by making the distance between each phosphor 18 and cathode 20 to be mostly the same for all phosphors 18, the change of electric field is made small, and when the distance between phosphor 18 and cathode 20 is shorter than that between grid 21 and cathode 20, an effect of the invention can further be exhibited, and a quantity of light is stabilized because of less influence of light emission by adjoining pixels. In this case, "the distance between phosphor 18 and cathode 20 which is shorter than that between grid 21 and cathode 20" means that a mean value of the distance between each phosphor 18 and cathode 20 is shorter than that of the distance between each grid and cathode 20.

In the Structure (15), as shown in FIG. 9(*b*), an area of each space surrounded by grid end line L1 of light emitting dot row 19, two lead wires extended from a phosphor and line L2 which is away from L1 by distance "a" is mostly the same as others. The distance "a" in this case is a distance necessary for L2 to be away from L1 within a range wherein the state of accumulation of electrons does not have a substantial influence on fluctuation of a quantity of light. The distance "a" is preferably not more than 6 times, more preferably not more than 3 times and still more preferably not more than 1.5 times the width of each phosphor in the direction of "a". In the comparative example in FIG. 9(*a*), space A and space B are formed so that space A is extremely greater than space B, while in the embodiment in FIG. 9(*b*), space A and space B are formed to be mostly the same by adjusting the width of a lead wire (width in the direction of arrangement of phosphors).

When the print head is left alone, electrons are considered to be accumulated on insulation portion on the wiring pattern, and this causes a possibility of occurrence of fluctuation of a quantity of light, and when thickness and shape of the wiring pattern are varied depending on the location, the state of accumulation of electrons is varied. However, by making the space A and space B of grid 21 to be mostly the same, it is possible to reduce occurrence of fluctuation of a quantity of light which is considered to be caused by accumulation of electrons on a grid portion.

Further, with the structure of the phosphor 18 shown in FIG. 9(*c*), the amount of light can be made stable.

In the embodiment shown in FIG. 9(*b*), space A and space B which are small in terms of area are preferable on the point that no influence is given to the electric field in the course of light emission.

In the Structure (16), grid voltage is established to be higher than phosphor voltage. Therefore, because of electrons from a cathode which can be accelerated and of shielding effect by the grid, it is possible to lessen an influence of the state of operations of adjoining phosphors such as whether the adjoining phosphor is turned on or turned off. It is therefore possible to lessen density difference caused between adjoining phosphors. There will be shown the results of exposure made after adjusting phosphor voltage and grid voltage to the values shown in Table 1.

TABLE 1

| | | Grid voltage (V) | | |
|---|---|---|---|---|
| | | 35 | 45 | 55 |
| Phosphor voltage (V) | 45 | D | C | B |
| | 40 | D | B | B |
| | 35 | C | A | A |
| | 30 | B | A | A |
| | 25 | A | A | A |

A: Density difference is hardly observed in visual check.
B: Slight density difference is observed in visual check, which is not a problem.
C: Density difference is observed in visual check, which, however, is not practically a problem.
D: Density difference is observed in visual check, which is a problem.

In the Structure (17), cathode 20, phosphor 18 and grid 20 are not energized except when the phosphor 18 is emitting light. Since the cathode, the phosphor and grid are not energized as stated above, it is possible to prevent that a quantity of light is lowered by light emission of the phosphor.

As shown in FIG. 13, voltage supply to the array head is controlled by signals from the power supply control section. There are given a method to control input voltage to the power supply circuit by signals from the power supply control section, and a method to control output voltage. The signals from the power supply control section are signals showing that image recording will be conducted, and they may be those showing the timing for conducting image recording, such as the timing for an operator to input, or the timing to set a silver halide color photosensitive material representing an image recording medium in a photographic paper magazine.

In the invention, control is conducted by turning on or turning off input voltage to the power supply circuit. When controlling output voltage, a cathode, a phosphor and a grid may either be controlled separately or be controlled integrally.

The surface of the glass base plate of the print head is an insulator on which electrons are sometimes accumulated. When an area covered by a grid or an anode is made to be mostly the same, therefore, it is preferable, in terms of light emitting under stable brightness, not to energize when no light is emitted, through the aforesaid control of power supply.

A period other than the time of light emitting mentioned in the invention means a suspension time or the time of no light emitting for a long time, and it also includes a period of energizing for ten-odd seconds before and after light emitting, taking rising and falling characteristics into consideration. When rising characteristics are taken into consideration, it is preferable to start energizing, 1–20 seconds earlier than the light emitting timing.

For example, in the example wherein voltage of 35 V is impressed on phosphor 18, 5.2 V is impressed on cathode 20 and 45 V is impressed on grid 21, cathode 20, phosphor 18 and grid 21 were left alone for the period of three hours to be turned on constantly and to be turned off, and a quantity of light was compared between the state before three hours and the state after three hours. A drop of a quantity of light was observed in the case where the cathode, the phosphor and the grid were left to be turned on constantly, but the drop was hardly observed in the case where the cathode, the phosphor and the grid were left to be turned off.

In the Structure (18), image focusing optical system 13 is a SELFOC lens array as shown in FIGS. 6(*a*)–6(*c*) and FIGS. 7(*a*) and 7(*b*), which makes the total apparatus to be small in size and low in cost.

In the Structure (19), image focusing optical system 13 is a SELFOC lens array, and the number of SELFOC lenses arranged is larger than that of light emitting dot row 19. By making the number of SELFOC lenses arranged to be larger than that of the light emitting dot row, the focal depth is long, a quantity of light can be corrected by photometry of a quantity of light alone, dispersion of a quantity of light can be controlled, focus fluctuation hardly influences, and no problem is caused with broader tolerance even when light emitting dots and SELFOC lenses are attached inaccurately.

In the Structure (20), cathode 20 is in a form of a wire, and it is therefore possible to install easily, and even plural cathodes 20 can easily be installed.

In the Structure (12), an image focusing optical system which forms an image with light from a light emitting dot is provided, and the focal depth of the image focusing optical system is long to be 350 $\mu$m or more. Therefore, the focal depth is long, and it is possible to correct a quantity of light by photometry of a quantity of light alone and thereby to control dispersion of a quantity of light.

In the Structure (13), the distance between each phosphor and the cathode in an optical recording head is mostly the same for all phosphors, and therefore, it is hardly influenced by light emission of adjoining pixels, and a quantity of light is stabilized.

In the Structure (14), the distance between the phosphor and the cathode in an optical recording head is shorter than that between the grid and the cathode stated above, and therefore, it is hardly influenced by light emission of adjoining pixels, and a quantity of light is stabilized.

In the Structure (15), occurrence of fluctuation of a quantity of light which is considered to be caused by accumulation of electrons on the grid portion can be reduced, because the area on the base plate which is not covered by the grid or an anode is mostly the same.

In the Structure (16), it is possible to reduce density difference caused between adjoining pixels, because voltage of the grid is higher than that of the phosphor of the optical recording head.

In the Structure (17), it is possible to prevent that a quantity of light is lowered by light emission of the phosphor, because the cathode, the phosphor and the grid are not energized except when the phosphor is emitting light, in the optical recording head.

In the Structure (18), it is possible to make the total apparatus to be small in size and to be low in cost, because the image focusing optical system is a SELFOC lens array.

In the Structure (19), arrangement of the SELFOC lens is greater in terms of number than light emitting dot rows, and therefore, the focal depth is long, and it is possible to correct a quantity of light through photometry of a quantity of light alone, dispersion of a quantity of light can be controlled, focus fluctuation hardly influences, and no problem is caused with broader tolerance even when light emitting dots and SELFOC lenses are attached inaccurately.

In the Structure (20), the cathode is in a form of a wire, and it is therefore possible to install easily, and even plural cathodes can easily be installed.

What is claimed is:

1. An image recording apparatus comprising:

a light emitting dot row provided on a base plate, said light emitting dot row comprising anodes arranged on the base plate in a form of an array of a single row or a plurality of rows and phosphors provided on the anodes;

a cathode, provided apart from the light emitting dot row, for emitting electrons that collide on the phosphors to thereby cause the phosphors to emit light;

a grid that covers at least a part of the base plate in a vicinity of the light emitting dot row;

an image focusing optical system having a focal depth of at least 350 $\mu$m for focusing light emitted from the light emitting dot row on an image recording position;

wherein the image focusing optical system comprises a lens array having a number of lenses that is greater than a number of dots of the light emitting dot row;

a driving element for driving the light emitting dot row so that the light emitting dot row emits light; and a conveyance device which conveys one of the light emitting dot row and an image recording medium so that the image recording medium moves relatively to the light emitting dot row.

2. The image recording apparatus of claim 1, wherein the focal depth of the image focusing optical system is not more than 1000 $\mu$m.

3. The image recording apparatus of claim 1, wherein the focal depth of the image focusing optical system is not more than 800 $\mu$m.

4. The image recording apparatus of claim 1, wherein the focal depth of the image focusing optical system is in a range of 400 $\mu$m–600 $\mu$m.

5. The image recording apparatus of claim 1, wherein the image focusing optical system is arranged to be shifted from the image recording position where light emitted from the light emitting dot row is focused in an optical axis direction by a distance which is greater than 0% and is not more than 60% of the focal depth.

6. An image recording method performed using the image recording apparatus of claim 1, said method comprising:

driving the light emitting dot row in accordance with image data so that light is emitted from the light emitting dot row;

making the light emitted from the light emitting dot row pass through the image focusing optical system; and making the light emitted from the light emitting dot row focus on the image recording medium which moves relatively to the light emitting dot row.

7. The image recording method of claim 6, wherein the focal depth of the image focusing optical system is not more than 1000 $\mu$m.

8. The image recording method of claim 6, wherein the focal depth of the image focusing optical system is not more than 800 $\mu$m.

9. The image recording method of claim 6, wherein the focal depth of the image focusing optical system is within a range of 400 $\mu$m–600 $\mu$m.

10. The image recording method of claim 6, wherein the image focusing optical system is arranged to be shifted from the image recording position where light emitted from the light emitting dot row is focused in an optical axis direction by a distance which is greater than 0% and is not more than 60% of the focal depth.

11. The image recording method of claim 6, wherein the image recording medium comprises a silver halide photosensitive material.

* * * * *